Sept. 27, 1938.                J. SACHS                2,131,641
                    ELECTRIC METER SERVICE INSTALLATION
                    Filed Oct. 24, 1935         2 Sheets-Sheet 1
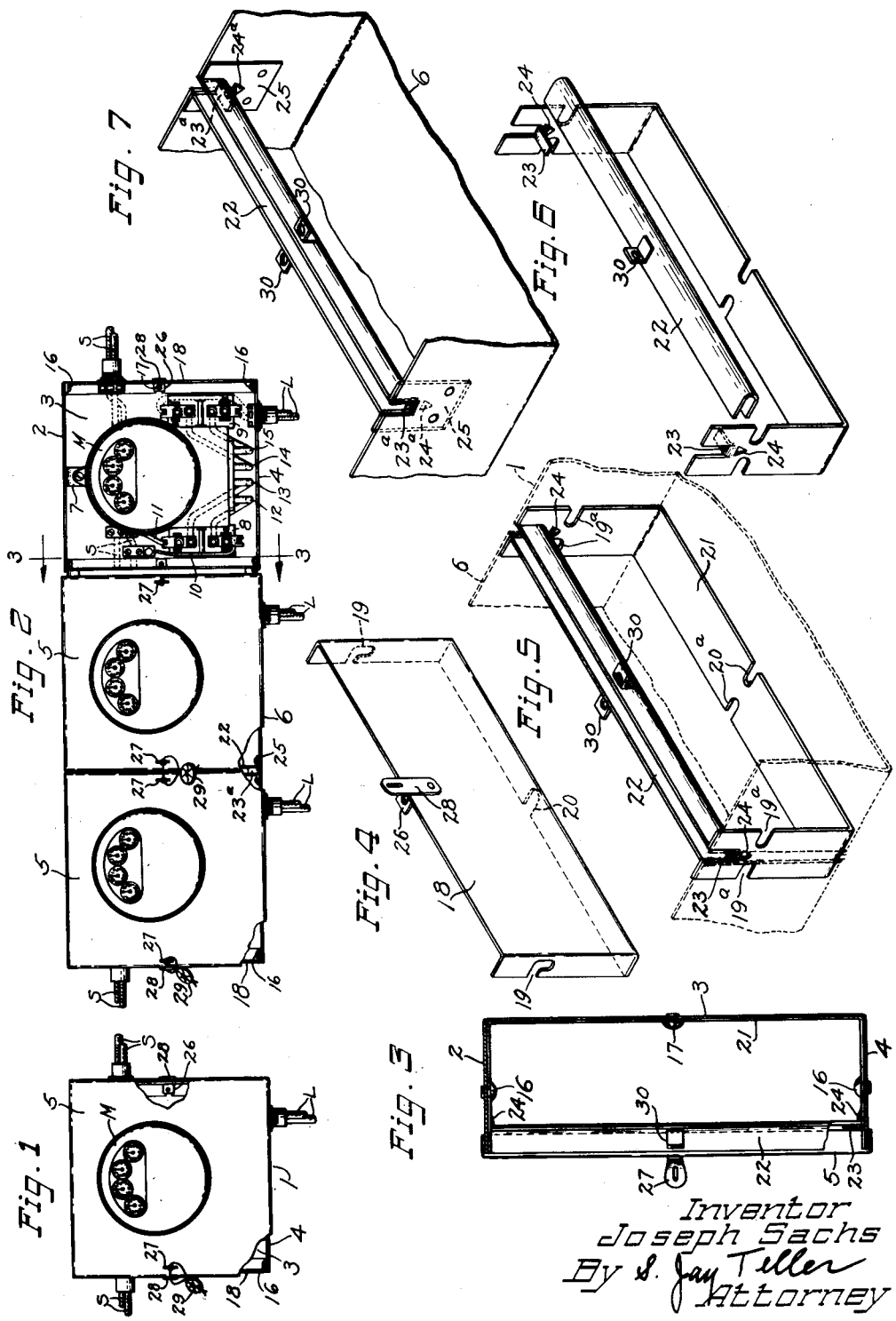
Inventor
Joseph Sachs
By S. Jay Teller
    Attorney Sept. 27, 1938.　　　　J. SACHS　　　　2,131,641
ELECTRIC METER SERVICE INSTALLATION
Filed Oct. 24, 1935　　　2 Sheets-Sheet 2
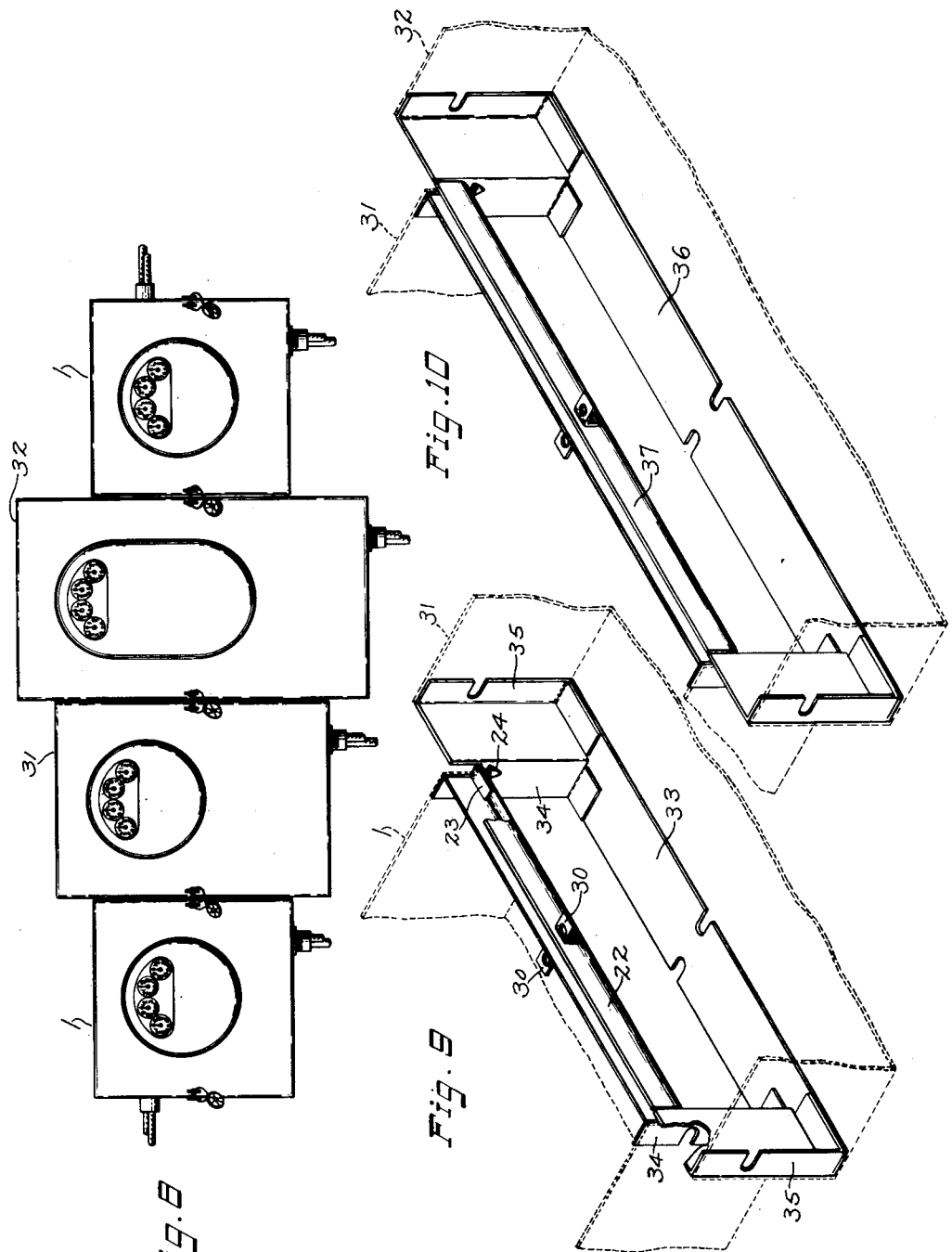

Patented Sept. 27, 1938

2,131,641

UNITED STATES PATENT OFFICE 2,131,641

ELECTRIC METER SERVICE INSTALLATION

Joseph Sachs, West Hartford, Conn., assignor to Colt's Patent Fire Arms Manufacturing Company, Hartford, Conn., a corporation of Connecticut Application October 24, 1935, Serial No. 46,517.

9 Claims. (Cl. 247—2)

The present invention relates particularly to an electric meter service installation of the character set forth in my prior Patent No. 1,758,981 dated May 20, 1930.

One object of the invention is to provide an improved means for sealing the joint between two adjacent covers, which means may also be used for locking the covers in place. A further object of the invention is to provide means whereby troughs of different widths may be conveniently connected together in one series.

In the accompanying drawings I have illustrated the embodiment of the invention which I now deem preferable, but it will be understood that the drawings are intended for illustrative purposes only and are not to be construed as defining or limiting the scope of the invention, the claims forming a part of this specification being relied upon for that purpose.

Of the drawings:

Fig. 1 is a front view of a meter service installation embodying the invention and comprising a single trough or trough unit. In this view a portion of the cover is broken away to show the side walls.

Fig. 2 is a front view of a meter service installation embodying the invention and comprising a series of two troughs or trough units connected together. In this view the cover for the right hand trough unit is omitted, and portions of the covers for the left hand trough unit are broken away.

Fig. 3 is an enlarged vertical sectional view taken along the line 3—3 of Fig. 2. In this view the meter and meter connection device are omitted.

Fig. 4 is an enlarged perspective view showing a side wall for one of the trough units.

Fig. 5 is an enlarged perspective view of the connector between the two adjacent trough units as shown in Fig. 2.

Fig. 6 is a view similar to Fig. 5 but showing the cross member turned about its axis and partly removed.

Fig. 7 is an enlarged perspective view showing the cross member for a multiple trough unit.

Fig. 8 is a view similar to Fig. 2 but showing a series of four trough units of different widths.

Figs. 9 and 10 are views similar to Fig. 5 but showing connectors adapted for use between trough units of different widths.

Referring to the drawings, particularly Figs. 1 and 2, I represents as an entirety an open-sided channel-shaped integral trough or trough unit having a top wall 2, a rear wall 3 and a bottom wall 4. The trough is preferably of uniform cross section throughout and it has an openable front cover 5. The trough is provided with means for the protective association therewith of an electric meter such as M. This meter protective means may be widely varied, but as shown the front cover 5 is provided with an opening through which a portion of the meter can project, as clearly shown in Fig. 1. It will be apparent that with the cover in place the terminal portion of the meter is entirely concealed within the trough and is protected from unauthorized manipulation or tampering.

Fig. 2 shows two troughs or trough units connected together in side-by-side alignment. One of these troughs is or may be the trough I already described, and the other trough 6 is shown as being similar to the trough I but longer, so as to be adapted to be protectively associated with two or more meters instead of only one meter. The trough 6 is otherwise similar to the trough I and it need not be described in detail. The trough 6 may have a single cover, but preferably there are two covers 5, 5 identical in construction with the cover 5 for the trough I.

When the meter is mounted to project through an opening in the front cover 5, the means for mounting the meter and the means for electrically connecting it with the circuit wires may be as shown in my copending applications for electric meter connection appliances, Serial No. 6,405, filed February 13, 1935, and Serial No. 46,518, filed October 24, 1935, which have matured into Patents Nos. 2,120,574 and 2,120,575, respectively. The mounting and connecting means will be briefly described, but as to further details reference may be had to the aforesaid application. The particular connection appliance referred to is shown and described merely as being representative, and it will be understood that the invention is not limited to the appliance shown. In fact, the invention is well suited for use with a connection appliance mounted on the front cover.

As shown in Fig. 2, the meter is supported in the trough I by means of a screw carried by a bracket 7 at the top of the trough. Within the trough and secured to the rear wall thereof are two insulating blocks 8 and 9 which are or may be identical in construction, these blocks being spaced apart so as to be exposed at the front without substantial obstruction by the meter. Service or line wires S, S extend horizontally, that is longitudinally, through the trough. Two short vertical conductors 10 and 11 are electrically connected at their upper ends with the service wires S, S and are electrically connected at their lower ends, through suitable conductors on the block 8, with flexible conductors 12 and 13 leading to the meter M. Other flexible conductors 14 and 15 lead from the meter to two suitable conductors on the block 9 by means of which they are electrically connected with load wires L, L.

The top, bottom and rear walls of each trough are provided respectively, near their edges, with screws 16, 16 and 17 adapted for engagement with detachable side members. Two such members are provided at the respective sides of the trough, each serving either to close the corresponding open side or to connect the trough with another similar trough in side-by-side alignment therewith to form a composite trough of desired length. As shown in Fig. 1, both of the detachable members are side walls 18, 18, but as will be presently explained, either or both of the detachable members may be a connector for connecting the trough with another similar trough.

One of the side walls 18 is shown in detail in Fig. 4, and it will be observed that this side wall is provided with top, rear and bottom flanges adapted to enter the trough and engage with the top, rear and bottom walls thereof. The top and bottom walls are provided with notches 19, 19 adapted to receive the corresponding screws 16, 16 carried by the top and bottom walls of the trough, and the rear flange is provided with a notch at 20 adapted to receive the corresponding screw 17 carried by the rear wall of the trough. It will be observed that the notches 19, 19 are provided with offset portions in which the screws are seated when the trough is in its normal position, thus being more firmly held. It will be understood that in putting the side wall in place, the screws 16, 16 are first entered in the notches 19, 19 with the side wall at an angle and that the wall is then swung into its normal position to engage the notch 20 with its screw 17. In removing the side wall, the reverse of the foregoing procedure is followed.

When two troughs are to be connected together in side-by-side alignment, as shown in Fig. 2, a detachable side member is provided which is in the form of a connector, as shown in detail in Fig. 5. This connector has a main body member 21 adapted to engage the edge portions of the top, bottom and rear walls of the respective walls, preferably at the inner surfaces thereof. The body member 21 is provided at each side with notches 19ª, 19ª and 20ª adapted respectively to receive the screws 16, 16 and 17 on the respective troughs. By tightening the screws the two troughs can be firmly connected together.

Preferably, in order to seal the joint between the covers for the two troughs, a vertical cross member 22 is provided which may advantageously be channel-shaped in section so that the flanges on the two covers may extend into it. The cross member 22 may be regarded as constituting a part of the connector between the two troughs, and it is carried by the main body member 21 of the connector. The cross member 22 is preferably readily removable so that the service wires S, S may be conveniently placed in the composite trough without the necessity for threading them in back of the cross members. The details as to the detachable mounting of the cross member may be varied, but preferably the main body member of the connector is formed at the top and bottom with inward projecting tongues 23, 23 which enter the end portions of the cross member and prevent its removal in the forward direction. Inward projecting lugs 24, 24 on the main body 21 engage the cross member to prevent rearward movement thereof. The construction is such that by turning the cross member about its own axis through approximately 90° it may be moved laterally and disengaged, as indicated in Fig. 6. By reverse movement it may obviously be re-engaged. Instead of turning the cross member as shown, it may be inserted or removed by flexing the top and bottom walls of the trough upward and downward, so as to permit the cross member, without turning, to move or snap past the lugs 24, 24.

As already stated, a plurality of covers are preferably provided for a multiple trough unit such as 6. In order to seal the joint between the two covers, a cross member 22 is provided which is preferably identical in construction with the member 22, already described. As shown in Fig. 7, this cross member 22 is held in place by means of tongues 23ª, 23ª and projections 24ª, 24ª formed on metallic pieces 25, 25 welded or otherwise secured to the top and bottom walls of the cabinet 6. Thus the intermediate cross member 22 in the trough 6 is held in the same manner as the cross member 22 on the connector and may be removed or replaced in the manner already described.

Preferably, the detachable members at the sides of the troughs are utilized for locking the covers in place. When the said detachable members are both side walls, as shown in Fig. 1, the cover 5 is locked directly to them. Each side wall is provided with an ear 26 having a threaded hole therein, and means such as screws 27 are provided adjacent the side edges of the cover for engaging the said ears and locking the cover in place. Each side wall is provided with a slotted finger 28 and the head of each screw 27 is correspondingly slotted so that the fingers and screws constitute seal receiving means through which a wire may be threaded and fastened by a seal 29 in the conventional manner.

When one of the detachable side members is a connector instead of a side wall, as for instance the connector 21—22, the edges of the corresponding covers are locked to the connector. Preferably, the cross member 22 is provided with ears 30, 30 similar in construction and in position to the ears 26 on the side walls. The screws 27, 27 at the edges of the corresponding covers engage the said ears 30, 30 to lock the covers in place. The two adjacent screws 27, 27 can be connected together by a wire and a seal, as shown in Fig. 2.

With a multiple trough unit such as 6 having two or more covers, the adjacent edges of the covers are locked to the corresponding intermediate cross member 22 in the manner already described and as shown in Fig. 2.

In Fig. 8 I have shown a series of troughs of different widths. The arrangement of such troughs may obviously be varied at will, but I have shown a series of four troughs in which the troughs at the ends are of the same size and construction as the trough 1 already described. Other wider troughs 31 and 32 are shown, and as these may be identical in construction except for the greater widths, detailed description is unnecessary. The openings in the covers of the troughs 31 and 32 may be varied as to position or as to shape to accommodate the particular meters for which the troughs are intended.

In order that the troughs of different widths may be connected together, I provide connectors which are similar in principle to the connector 21—22 already described. In Fig. 9 there is shown a connector for connecting the two troughs 1 and 31. This trough has a main body member 33 with portions of different widths to engage the edge portions of the top, bottom and rear walls of the respective troughs. The flanges 34, 34 are spaced to engage the top and bottom walls of the trough 1, and the flanges 35, 35 are spaced to engage the top and bottom walls of the trough 31. The main body member of the connector is provided with tongues 23 and lugs 24 adapted to engage and hold a cross member 22 which may be identical in construction with the cross member 22 already described. The covers are locked in place as already described and repetition of the description is unnecessary.

In Fig. 10 I have shown a connector 36 adapted to connect the two troughs 31 and 32. The construction is the same in principle as that shown in Fig. 9, the only difference being in the dimensions. It will be obvious that the cross member 37 is longer than the cross member 22, its length corresponding to the width of the trough 31.

A similar connector for connecting the troughs 32 and 1 may be provided, but this is not illustrated as its construction is similar to that of the connectors shown in Figs. 9 and 10.

What I claim is:

1. An electric meter service installation comprising in combination, a channel-shaped trough adapted for enclosing at least two spaced meter service appliances, means for closing the trough at the sides thereof, at least two independently openable front covers for the trough, a removable cross member extending transversely of the trough and located behind the adjacent edges of two adjacent covers to seal the joint between them, and means independent of the covers for normally holding the cross member against forward removal, the said means permitting the cross member to be disengaged therefrom and removed from said trough upon being turned about its own axis.

2. An electric meter service installation comprising in combination, a channel-shaped trough adapted for enclosing at least two spaced meter service appliances, means for closing the trough at the sides thereof, at least two independently openable front covers for the trough, a removable cross member extending transversely of the trough and located behind the adjacent edges of two adjacent covers to seal the joint between them, means independent of the covers for normally holding the cross member against forward removal, the said means permitting the cross member to be disengaged therefrom and removed from said trough upon being turned about its own axis, and means on the cross member for enabling the two covers to be locked thereto.

3. An electric meter service installation comprising in combination, two open-sided channel-shaped integral troughs each provided with means for the protective association therewith of an electric meter and each adapted at each side for connection with a detachable side wall or with a detachable connector, a detachable connector at adjacent sides of the troughs and serving to hold them in side-by-side alignment, two independently openable front covers for the respective troughs, a removable cross member carried by the detachable connector and extending transversely of the troughs behind the adjacent edges of the two adjacent covers to seal the joint between them, and means independent of the covers for normally holding the cross member against forward removal, the said means permitting the cross member to be disengaged therefrom and removed from said troughs upon being turned about its own axis.

4. A connector for two open-sided channel-shaped troughs adapted for enclosing meter service appliances and provided with removable front covers, the said connector comprising in combination a main body member adapted to engage the edge portions of the top, bottom and rear walls of the respective troughs, a removable cross member extending transversely across the front of the connector to seal the joint between the two covers, and means on the connector body for normally holding the cross member against forward removal, the said means permitting the cross member to be disengaged therefrom and removed from said connector body upon being turned about its own axis.

5. A connector for two open-sided channel-shaped troughs adapted for enclosing meter service appliances and provided with removable front covers, the said connector comprising in combination a main body member adapted to engage the edge portions of the top, bottom and rear walls of the respective troughs, a removable cross member extending transversely across the front of the connector to seal the joint between the two covers, means on the connector body for normally holding the cross member against forward removal, the said means permitting the cross member to be disengaged therefrom and removed from said connector body upon being turned about its own axis, and means on the cross member for enabling the two covers to be locked thereto.

6. The combination in an electric meter service installation, of two adjacent open-sided channel-shaped troughs of different widths and each provided with means for the protective association therewith of at least one electric meter and each adapted at each side for connection with a detachable side wall or with a detachable connector, a detachable connector at adjacent sides of the two adjacent troughs of the series and serving to hold them in side-by-side relationship, the said connector having a main body member with portions of different widths to engage the edge portions of the top, bottom and rear walls of the respective troughs, two detachable side walls at the remaining sides of the two troughs serving to close the said sides, and two independently openable front covers for the respective troughs.

7. The combination in an electric meter service installation, of two adjacent open-sided channel-shaped troughs of different widths and each provided with means for the protective association therewith of at least one electric meter and each adapted at each side for connection with a detachable side wall or with a detachable connector, a detachable connector at adjacent sides of the two adjacent troughs of the series and serving to hold them in side-by-side relationship, the said connector having a main body member with portions of different widths to engage the edge portions of the top, bottom and rear walls of the respective troughs, two detachable side walls at the remaining sides of the two troughs serving to close the said sides, two independently openable front covers for the respective troughs, and devices engageable with the covers adjacent the side edges thereof for detachably locking the covers to the said connector.

8. The combination in an electric meter service installation, of two adjacent open-sided channel-shaped troughs of different widths and each provided with means for the protective association therewith of at least one electric meter and each adapted at each side for connection with a detachable side wall or with a detachable connector, a detachable connector at adjacent sides of the two adjacent troughs of the series and serving to hold them in side-by-side relationship, the said connector having a main body member with portions of different widths to engage the edge portions of the top, bottom and rear walls of the respective troughs, two detachable side walls at the remaining sides of the two troughs serving to close the said sides, two independently openable front covers for the respective troughs, a cross member carried by the detachable connector and extending transversely of the trough and located behind the adjacent edges of the two adjacent covers to seal the joint between them, and means for locking each cover directly to the said transverse cross member.

9. The combination in an electric meter service installation, of two adjacent open-sided channel-shaped troughs of different widths and each provided with means for the protective association therewith of at least one electric meter and each adapted at each side for connection with a detachable side wall or with a detachable connector, a detachable connector at adjacent sides of the two adjacent troughs of the series and serving to hold them in side-by-side relationship, the said connector having a main body member with portions of different widths to engage the edge portions of the top, bottom and rear walls of the respective troughs, two detachable side walls at the remaining sides of the two troughs serving to close the said sides, two independently openable front covers for the respective troughs, a removable cross member extending transversely of the trough and located behind the adjacent edges of two adjacent covers to seal the joint between them, and means independent of the covers for normally holding the cross member against forward removal, the said means permitting the cross member to be disengaged therefrom upon being turned about its own axis.

JOSEPH SACHS.